May 12, 1942. H. B. ALDERMAN ET AL 2,282,445
LIGHTING FIXTURE
Filed May 9, 1940 5 Sheets-Sheet 1
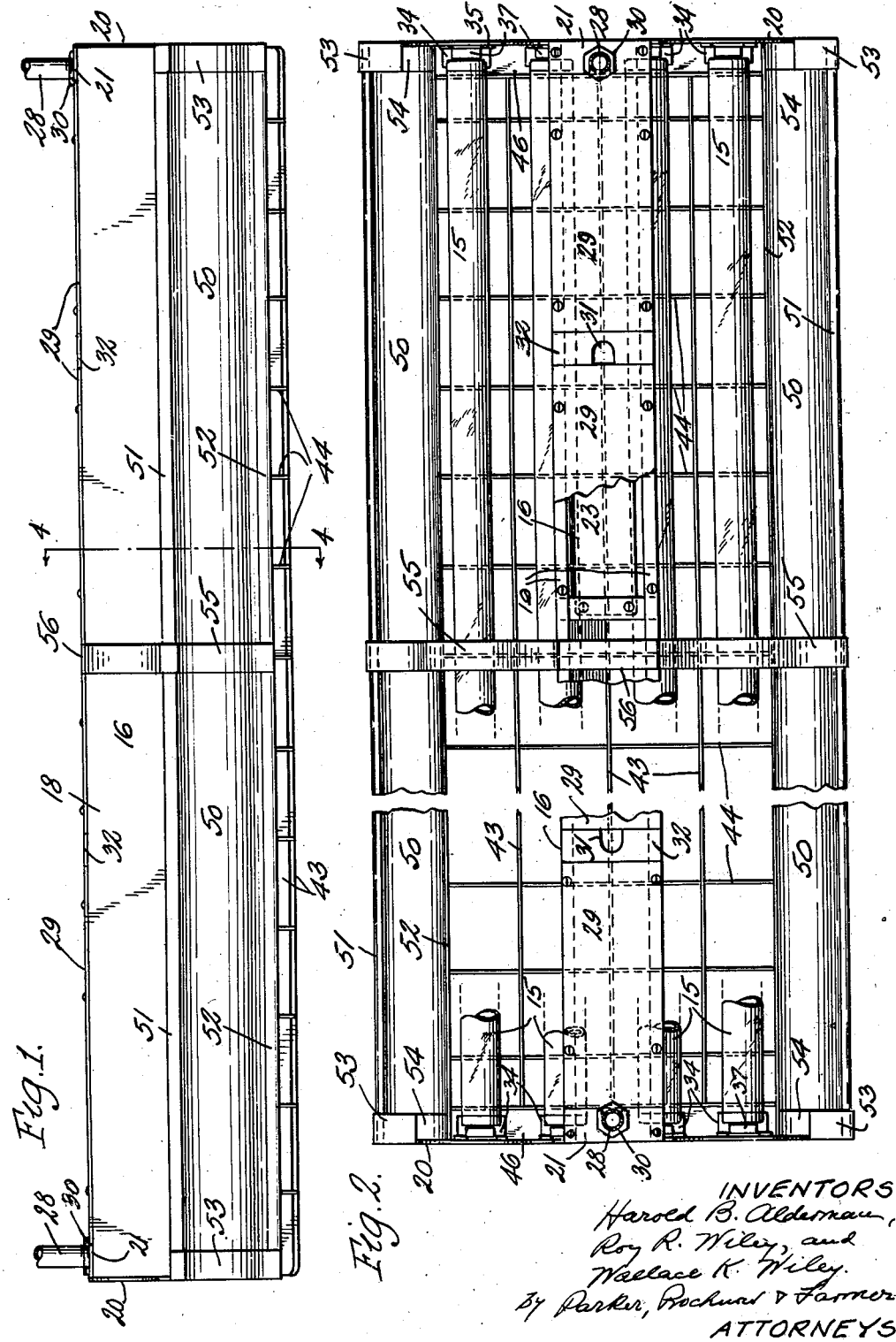
INVENTORS.
Harold B. Alderman,
Roy R. Wiley, and
Wallace K. Wiley.
By Parker, Brockman & Farmer
ATTORNEYS.

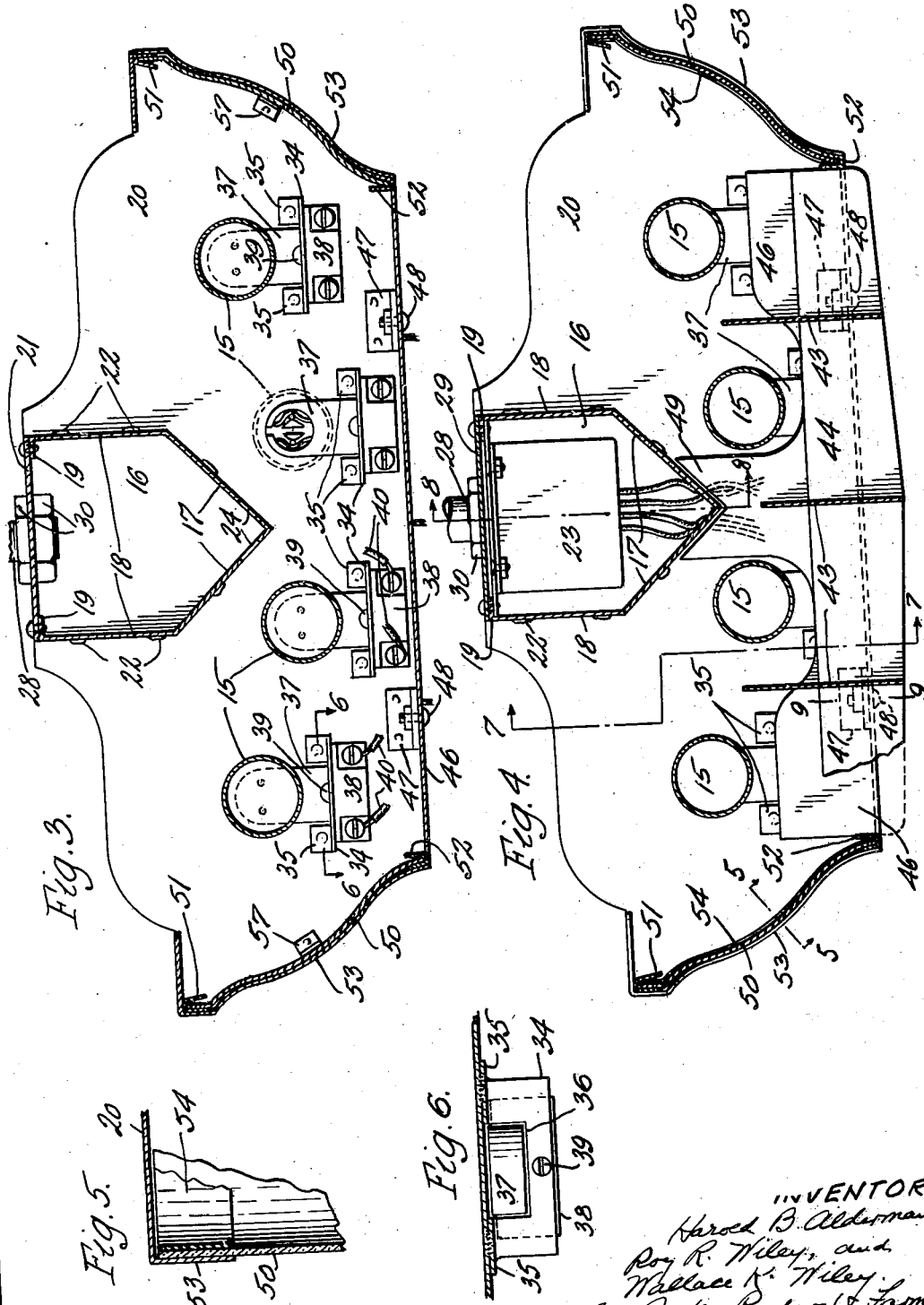

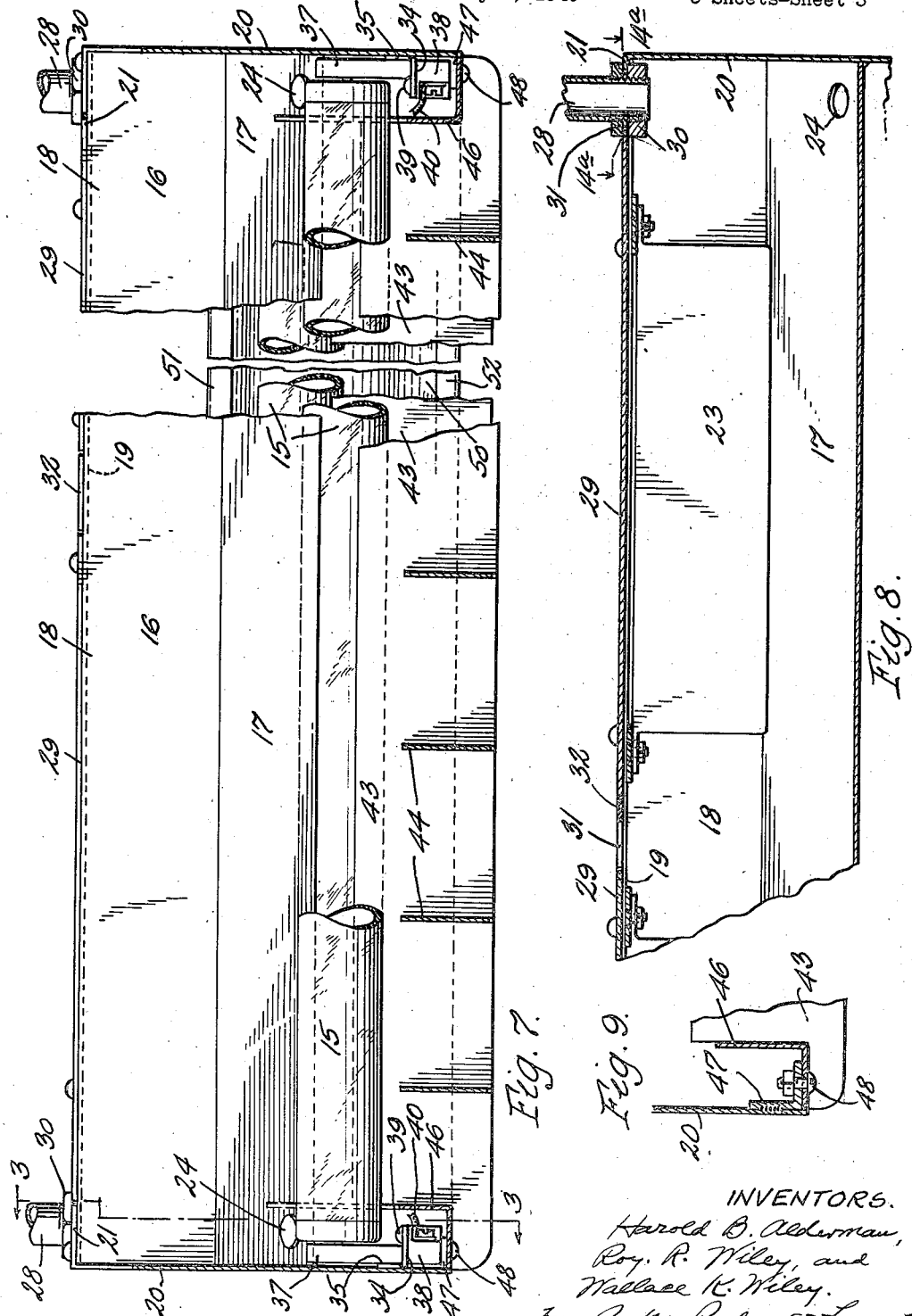

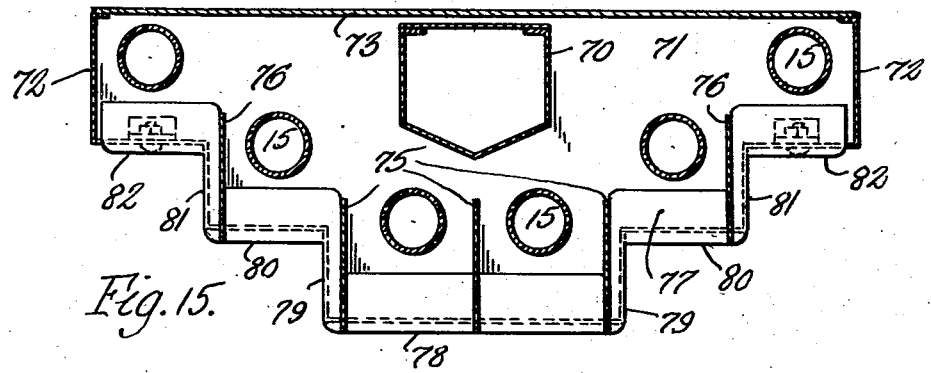
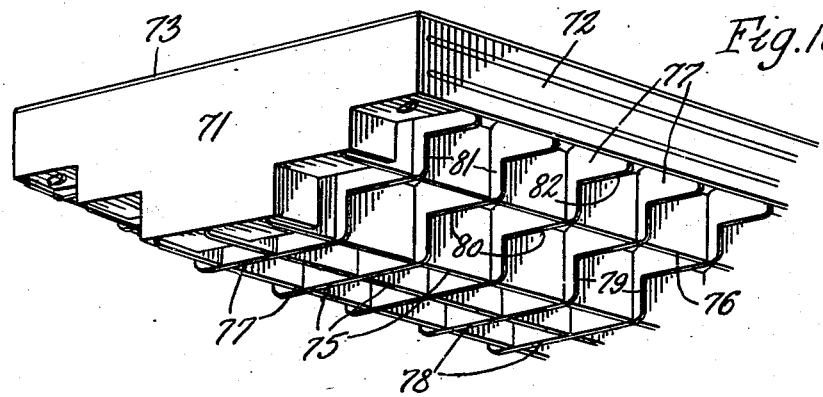
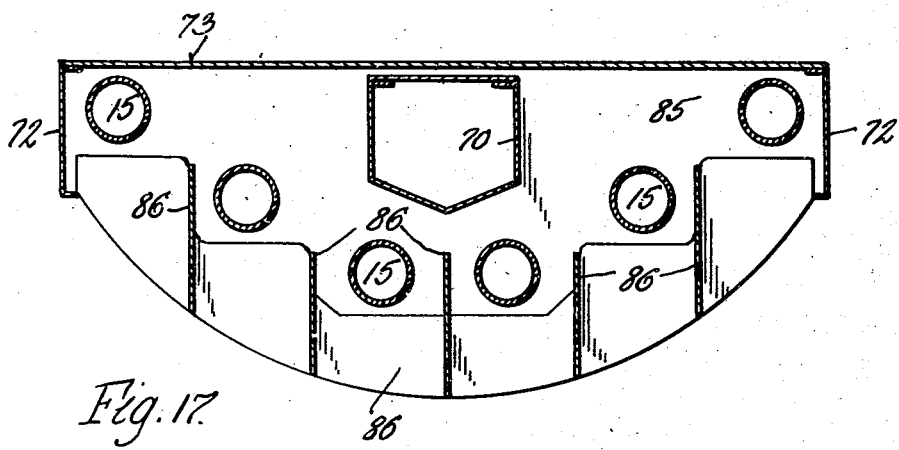

Patented May 12, 1942

2,282,445

UNITED STATES PATENT OFFICE 2,282,445

LIGHTING FIXTURE

Harold B. Alderman and Roy R. Wiley, Buffalo, and Wallace K. Wiley, Tonawanda, N. Y., assignors to R. & W. Wiley, Inc., Buffalo, N. Y.

Application May 9, 1940, Serial No. 334,188

10 Claims. (Cl. 240—78)

This invention relates to improvements in lighting fixtures, and more particularly to fixtures of this kind adapted for use in connection with elongated tubular electrical illuminators.

One of the objects of this invention is to provide a lighting fixture of this kind which is so constructed as to provide for an efficient use of the light available and for a diffusion of the light in such a manner as to avoid glare. Another object of this invention is to provide a fixture of this kind of novel and improved construction, and which comprises relatively few parts. Another object of this invention is to provide a fixture of this kind in which the tubular illuminators are arranged at different elevations to provide for the most efficient distribution of light. A further object is to provide a fixture in which the illuminators are arranged at different elevations and in which a louvre assembly is employed, the lower surface of which follows approximately the contour of the arrangement of the illuminators. It is also an object of this invention to provide a fixture of this kind in which tubular illuminators, reflecting surfaces and a louvre assembly are arranged in a novel and improved manner so as to provide for the best distribution of light. A further object is to provide a fixture of this kind adapted to be used in connection with fluorescent tubes and which is so constructed as to contain and conceal the reactors, switches and other parts necessary for use in connection with tubes of this kind. A further object is to provide a fixture of this kind with a longitudinally extending hollow beam or structural member within which the electrical apparatus may be contained and which imparts the necessary rigidity and strength to the fixture. A further object of this invention is to provide a fixture of this kind having a hollow structural beam which is so formed that the outer surfaces thereof may be used to reflect light in the desired directions. Another object is to provide novel means for supporting a fixture of this kind in suspended relation from a ceiling or other structure. Other objects of this invention will be evident from the following description and claims.

In the accompanying drawings:

Fig. 1 is a side elevation of a lighting fixture embodying this invention.

Fig. 2 is a fragmentary top plan view thereof.

Fig. 3 is a transverse section thereof, taken on line 3—3 of Fig. 7.

Fig. 4 is a similar view, taken on line 4—4, Fig. 1, on an enlarged scale.

Fig. 5 is a fragmentary section on line 5—5, Fig. 4.

Fig. 6 is a sectional plan view taken in part on line 6—6, Fig. 3.

Fig. 7 is a fragmentary sectional elevation on line 7—7, Fig. 4.

Fig. 8 is a fragmentary sectional elevation on line 8—8, Fig. 4.

Fig. 9 is a fragmentary sectional view on line 9—9, Fig. 4.

Fig. 15 is a transverse section on a smaller scale of a lighting fixture of modified construction.

Fig. 16 is a fragmentary perspective view thereof, looking upwardly at the fixture.

Fig. 17 is a transverse section of a lighting fixture similar to that shown in Figs. 15 and 16 but having a louvre assembly of slightly different shape.

Figure 10:
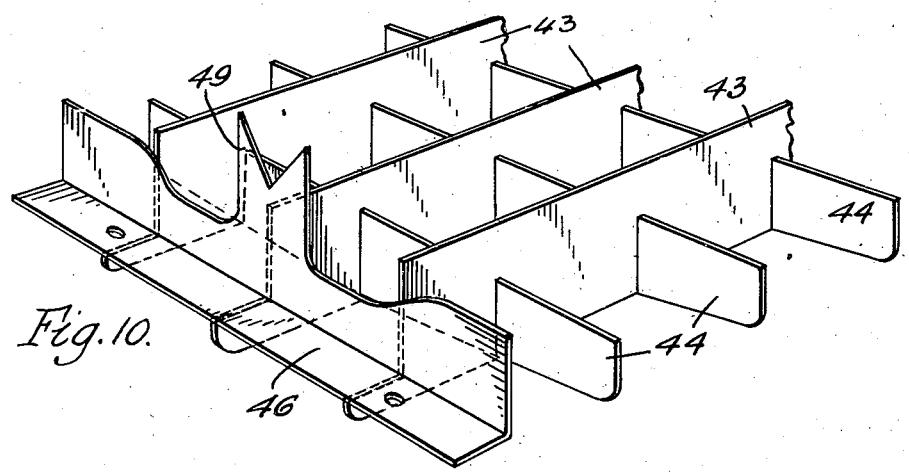
Fig. 10 is a fragmentary perspective view of an end of the louvre assembly detached from the lighting fixture.
Figure 11:
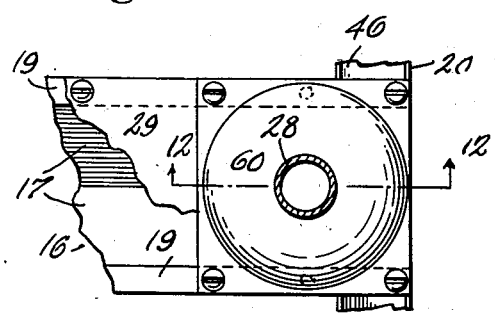
Fig. 11 is a fragmentary top plan view of the portion of the lighting fixture, showing an attaching means of modified construction.
Figure 12:
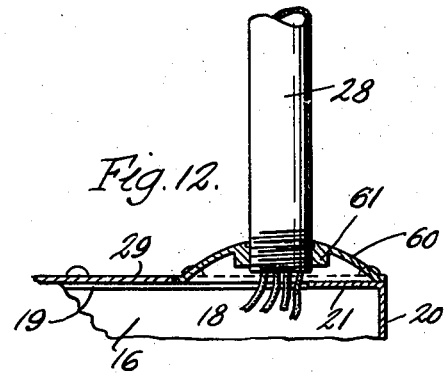
Fig. 12 is a fragmentary sectional elevation thereof, taken approximately on line 12—12, Fig. 11.

The lighting fixture is shown in the drawings as constructed for use with elongated tubular electrical illuminators of the gas filled type, such for example as are generally referred to as "fluorescent tubes." It is not intended, however, to limit this invention to use in connection with such tubes, since obviously the fixture can be employed with tubular illuminators of other types. 15 represents the tubular illuminators, four of which are shown in the fixture illustrated in Figs. 1 to 14, six being shown in the fixtures shown in in Figs. 15 to 17. It will be understood, however, that the lighting fixture constituting this invention may be used with one or any number of illuminators.

Our improved fixture for use in connection with tubes of this kind has a supporting frame which preferably includes a longitudinally extending central hollow beam or structural member 16, which may be formed in any suitable manner, for example, of sheet metal bent into the desired shape. The beam preferably has inclined downwardly converging lower webs 17 terminating at their upper edges in upright webs 18, thus forming a box-like hollow member of considerable rigidity against bending in any direction. The upper edges of the webs 18 are preferably provided with inwardly extending flanges or lugs 19.

The supporting frame also includes end plates 20 suitably secured to the opposite ends of the hollow beam in any suitable manner. For example, each end plate may be provided at its upper edge with an inwardly extending flange 21 which may be fastened by screws or otherwise secured to the flanges 19 of the hollow beam. If desired, the beam may be further secured to the end plates 20, by means of welding as indicated by 22. These end plates form the main supports for various parts of the fixture. The beam 16 is of sufficient dimensions both vertically and crosswise to provide ample rigidity and to securely support the end plates 20 in correct relation to each other, and the end plates also serve to hold the sides of the hollow beam in their correct positions, thus forming a strong and rigid frame for supporting the various parts of the fixture.

The hollow beam 16 in addition to its structural features also serves as a container for various electrical devices which may be necessary for use in connection with the tubular illuminators. For example, if the fixture is used with fluorescent tubes, a transformer or reactor 23 may be mounted within the hollow beam 16 and any other electrical devices, such as switches and the conductors leading from these devices and to the tubes 15, may be arranged within the hollow beam, so that the fixture itself contains all the devices necessary for the operation of the tubes. The hollow beam 16 may be provided at its ends with suitable apertures 24 through which conductors may pass to the tubes.

The hollow beam is preferably formed of a single piece of sheet metal bent into the shape desired, and the top of the beam may be closed in any suitable manner, for example, by means of suitable covering plates which may be in the form of removable plates 29 secured, for example, by screws or other means passing through these plates and the flanges 19 in such a manner that the plates 29 can be removed to afford access to the interior of the hollow beam for inspection, repair, or replacement of the electrical devices contained within the beam.

Figure 14:
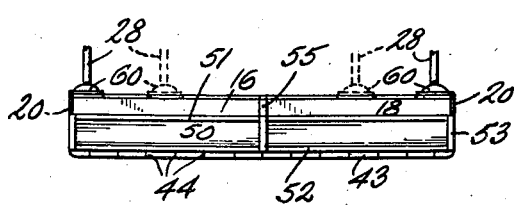
Fig. 14 is a side elevation of a single lighting fixture having indicated thereon different means for supporting the same.
Figure 14A:
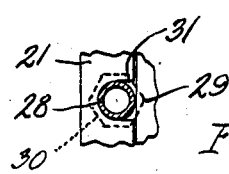
Fig. 14a is a fragmentary horizontal section on line 14a—14a, Fig. 8.

For supporting the fixture from a ceiling or other horizontal support, conduits or pipes 28 may be connected to one of the flanges 21 of an end plate 20 in any suitable or usual manner, and in the construction illustrated, a pair of nuts 30 are mounted on the lower threaded end of the conduit, and are spaced slightly apart, and the flange is provided with an open ended slot 31, see Fig. 14a, through which the conduit 28 may extend. By screwing the nuts 30 into firm engagement with the opposite faces of the flange 21, the fixture may be securely attached to the conduits. This arrangement also enables the fixture to be mounted in a true horizontal position, since the nuts 30 may be shifted up or down, as required for this purpose. When assembled, the adjacent cover plates 29 will close the open ends of the slots 31, and prevent disengagement of the conduits from the slots.

If it should be found necessary or desirable to attach the fixture to the conduits 28 at points at some distance from the ends of the fixture, this may be accomplished by attaching intermediate straps or pieces 32 transversely across the beam 16, as by welding them to the flanges 19 thereof, see Figs. 2, 7 and 8, and providing these straps with the notches or slots 31, as in the case of the flanges 21. Obviously, these notched straps 32 will serve the same purpose as the flanges 21, as a means of connection between the fixture and the conduits, and the ends of adjacent cover plates 29 will close the notches of the members 32, as clearly shown.

Another advantage of the mounting described is that it enables a single workman to easily install a fixture, since by first securing the conduits to the ceiling in desired position, the fixture can be attached to the conduits by slipping one conduit into a notch 31 between the nuts 30, and then by slightly shifting the other conduit, it may be sprung into the notch of another flange 21, or strap 32, after which the nuts may be adjusted for leveling the fixture, and then tightened, as explained. The cover plates 29 are then attached and the assembly completed. The conduits 28, consequently, serve the two-fold purpose of carrying the electrical conductors to the interior of the hollow beam 16 and for supporting the fixture. Hollow beams of other construction and other means for supporting them may, of course, be employed, if desired.

The tubular illuminators 15 may be supported from the end plates 20 in any suitable or desired manner. In the construction shown for this purpose, supporting brackets are welded or otherwise secured to the inner faces of the end plates 20, the brackets shown by way of example in the construction illustrated each including a horizontal web or shelf 34 having vertically extending lugs 35 formed thereon which may be welded to the inner face of an end plate. The horizontal portion or shelf 34 may be provided with an aperture 36 through which a portion 37 of a socket or connector extends. These connectors are usually provided with a lower enlarged portion 38, which may extend against the lower face of the ledge or shelf 34 and may be secured thereto by means of a screw 39. These sockets or connectors are of standard construction and of themselves constitute no part of this invention. The upper ends of the connectors are formed to receive the ends of the illuminators 15 and to conduct the necessary electric current to these illuminators from wires or conductors 40 secured to suitable binding posts on the lower portions 39 of the connectors. Any other suitable means for holding the connectors in place on the end plates 20 may be employed, if desired. If fluorescent tube illuminators are used, then these connectors are provided on both of the end plates 20.

In order to avoid glare, a louvre assembly is arranged in the lower portion of the fixture below the illuminating tubes 15 and this louvre assembly may be of any suitable or desired construction, including a plurality of longitudinally extending upright webs 43 and tranversely extending webs 44, both webs being preferably made of relatively thin sheet metal. The longitudinal members 43 preferably extend substantially throughout the length of the fixture and are supported at their ends from the end plates 20, and the transverse webs are supported on the longitudinal webs. Any suitable or desired construction may be provided for securing the louvre assembly on the fixture. As illustrated in the drawings, see particularly Figs. 9 and 10, a transversely extending angle-shaped end member 46 is secured to each end of the longitudinal webs 43 of the louvre assembly. Preferably this angle-shaped member 46 has an upright web which is welded or otherwise secured to the longitudinal members 43 and a horizontally outwardly extending web, which may be bolted or otherwise secured to the adjacent end member 20. For this purpose, a number of lugs or angle-shaped parts 47 are preferably welded or otherwise secured to the inner faces of the end plates 20 and these lugs have horizontally extending flanges to which the horizontally extending flanges of the end members 46 of the louvre assembly may be secured in any suitable manner, for example, by means of bolts 48. This construction not only firmly secures the louvre assembly to the end plates 20 of the fixture, but also the angle-shaped end pieces 46 form with the end plates 20 troughs in which the conductors 40 leading to the connectors or sockets for the illuminators may be confined and concealed. The end members 46 for this purpose may be provided with upwardly extending parts 49 which project into close proximity to the lower portion of the hollow beam 16 so as to conceal the portions of the conductors passing out of the apertures 24 of the hollow beam, as clearly shown in Fig. 4. This figure also shows that the longitudinal members 43 of the louvre assembly are preferably arranged midway between the illuminators 15.

The sides of the fixture may be formed in any suitable or desired manner. In the construction illustrated, translucent panels 50 are preferably provided which prevent glare from the illuminating tubes arranged nearest to the opposite sides of the fixture. These panels may be of any suitable or desired material, but preferably the panels are made of a relatively thin translucent flexible synthetic resin material, which transmit light to an extent sufficient to not interfere materially with the efficiency of the fixture. These translucent panels 50 preferably are curved, for example as shown, to provide for a better diffusion of light from the illuminators and to present a pleasing appearance, and the upper and lower edges of the panels may be confined in metal retaining bars 51 and 52 respectively. These bars may be suitably secured at their ends to the end plates 20. In order to hold the ends of the bars and panels in place, the end plates 20 may be provided at their opposite sides with flanges 53 to which the bars 51 and 52 may be welded or otherwise secured.

It may also be desirable to support these panels intermediate of their ends and this can readily be done by providing one or more metal strips 55 intermediate of the ends of the fixture which connect the upper and lower panel retaining bars 51 and 52, and then extend to the upper edges of the hollow beam 16, as shown in Figs 1 and 2. In the particular construction shown, these strips end at the sides of the beam and a short strip 56 may be provided which extends across the top of the beam. Any other means of connecting these strips to the hollow beam 16 may, however, be employed. These strips not only reinforce the middle portions of the edge supporting bars 51 and 52 of the fixture and serve to hold them in place, but also by means of these intermediate strips 55, the panels 50 of translucent material may be made in shorter lengths, each length extending from the intermediate strip to an opposite end plate.

The inner ends of the panels may be held in contact with these strips or flanges 55 by means of holding strips of metal 54, see Fig. 4, arranged at the inner faces of said portions of the panels 50 and held in place by means of the longitudinal bars 51 and 52. By making these metal strips of the same curvature as the panels, the metal strips 54 serve to hold the panels rigidly at their inner ends in their correct curvatures and to press them tightly against the intermediate strips 55.

The outer ends of the translucent panels 50 may be held in position by means of small angle pieces 57, Fig. 3, secured, as by welding, to the end plates 20 and each angle having one flange extending parallel to and spaced slightly from the adjacent flange 53 of the end plate. Into this space, the end of the panel 50 may be inserted so as to be held in correct curved shape. This arrangement while preventing detachment of the panels, enables the panels to have a limited expansion or contraction, such as may occur with some materials under varying conditions of temperature and moisture changes.

While the panels are shown as curved, it will be understood that panels of any desired shape may be employed, and glass or other rigid materials may be employed in place of the flexible panels herein described. The panels preferably have their inner surfaces polished so that these panels will not only permit light to pass through them, but will also reflect some light.

Figure 13:
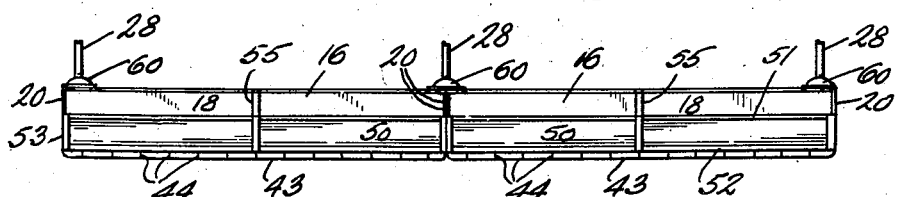
Fig. 13 is a side elevation of two lighting fixtures embodying this invention, arranged end to end.

The fixture herein described may be used singly, or if desired, any number of these fixtures may be arranged end to end to form a continuous fixture. If this arrangement is desired, holes can be very readily drilled through the adjacent end plates 20 of two fixtures and these end plates may then be secured together by means of bolts or the like. The combined fixtures will then appear as shown in Figs. 13, and may be suspended from three separate conduits 28, the middle one of which is connected to each of the two fixtures. For facilitating this type of arrangement, a cover member or supporting strip of modified construction may be provided as illustrated in Figs. 11 to 14. In these figures, the supporting strap has a central dome-shaped portion 60 which may be made from a flat piece of metal, the edge portions of which are left flat so that they can be easily secured to the flanges 19 of the hollow beam. The middle portion of the dome-shaped part 60 may have an enlarged portion 61 formed or welded thereon, which may be threaded to cooperate with the screw threads on the conduit 28. In the construction shown in Figs 11 and 12, this supporting strap is secured to an end of a fixture, but obviously the strap may be secured to any portion of the hollow beam of the fixture, for example, spaced from the ends of the fixture, as shown in broken lines in Fig. 14. With this type of supporting strap, the same may be arranged as shown in the middle portion of Fig. 13, by securing the same to two adjacent fixtures, so that conductors from the conduit 28 may extend to both of the adjacent fixtures.

The inner faces of the various parts comprising the fixture are preferably made light reflecting in any suitable or desired manner, for example, by coating them with an aluminum paint. The outer faces of the hollow beam 16 are preferably made reflecting, as well as all of the faces of the louvre assembly, and if desired, the inner faces of the end plates 20 may also be made to reflect light. With this arrangement, light is diffused or reflected in many different directions so that glare or excessive concentration of light at any point is avoided. It will be noted that the extremities of the longitudinal louvre members 43 are extended beneath the horizontal flanges of the attaching angle pieces or members 46, thus enabling these extended parts to receive and reflect light to the under faces of said flanges and prevent the appearance of dead spots or shadows at the ends of the fixtures.

It is an important feature of this invention that the illuminating tubes are arranged at different elevations from the louvre assembly and from the reflecting outer surfaces of the hollow beam 16. This is clearly illustrated in Figs. 3 and 4 in which the outer two tubes 15 are arranged at a higher level than the two middle tubes. This has an important effect upon the diffusion of light from the fixture, since it will be obvious that light emanating from the two outer tubes will strike the various reflecting surfaces at different angles from light emanating from the two inner tubes. Not only does the light from the two tubes of different elevations strike the reflecting outer surfaces of the hollow beam 16 at different angles, but also the light strikes the longitudinal and transverse members 43 and 44 of the louvre assembly at different angles. Furthermore, by means of the arrangement described, the inner tubes 15 are so located that they do not intercept the passage of light from the outer tubes to the inclined lower webs 17 of the hollow beam. The arrangement of the tubes is therefore very effective in avoiding any excessive concentration of light at any portion of a room and in increasing the efficiency of the fixture.

It is intended that the fixture be suspended at a distance from the ceiling by means of conduits 28 or other suitable suspension means, and the fixture, consequently, provides both direct and indirect illumination. It will be noted that the upper portion of the fixture is entirely open except for the part shut off by the hollow beam 16. The lower portion of the fixture is also in the main open so that light from the tubes may pass directly downwardly through the open spaces in the louvre assembly or reflected light may pass from the faces of the longitudinal and transverse louvre plates downwardly. The louvre assembly serves the main purpose of preventing glare from the fixture to any one looking upwardly at the same from a side thereof at an angle of less than about 45° to the horizontal. By arranging the two outer tubes 15 at a higher altitude above the louvre assembly than the two inner tubes, these tubes are shielded by the louvres 43 and 44 and the panels 50 so that these tubes can only be seen if a person looks upwardly at an angle materially greater than 45° from a side of the fixture. The arrangement of the tubes, consequently, also helps to materially decrease the possibility of glare from the fixture.

By means of the arrangement of the tubes at different elevations, it will be noted that light emanating from the two inner tubes 15 will be deflected partly downwardly from the inclined webs 17 of the beam 16 and partly laterally and upwardly toward the ceiling at a considerable angle thereto, while light from the two outer tubes striking the outer faces of the webs 17 will be deflected mainly downwardly. The beam 16, consequently, serves the further purpose of preventing an intense concentration of light on the ceiling immediately above the fixture, since much of the light from the two inner tubes 15 is reflected laterally and downwardly from the beam 16.

The open upper and lower portions of the fixture have the further advantage that the tendency of dust or dirt to accumulate on the fixture is greatly reduced, since there are comparatively few horizontal or nearly horizontal surfaces on which dust can become deposited. This fixture, therefore, requires very little cleaning in order to maintain its efficiency at the maximum.

By providing space within the hollow beam for conductors, reactors, switches, or the like, the need for another receptacle for this purpose is eliminated, and the beam itself is concealed so as not to detract from the appearance of the fixture.

Most of the principles and structural features employed in connection with Figs. 1 to 14 inclusive are also incorporated in the modified forms of our improved fixture, as shown in Figs. 15 to 17 inclusive, but for sake of simplicity, some of the details illustrated in Figs. 1 to 14 have been omitted in Figs. 15 to 17. The fixtures shown in Figs. 15 to 17 differ from those shown in Figs. 1 to 14 mainly in that the fixtures of Figs. 15 to 17 may be secured directly to a ceiling in a room in any suitable manner, although these fixtures may also be suspended at a distance below the ceiling as those shown in Figs. 1 to 14. These fixtures shown in Figs. 15 to 17 have six tubular illuminators 15, but it will be obvious that any desired number of these illuminators may be employed, and the fixtures shown may also be provided with hollow beams 70.

In Figs. 15 and 16, the ends of the hollow beams are secured to end plates 71, which in the construction illustrated are connected by longitudinally extending side plates 72 which may be made of metal, or if desired, may be provided with translucent material similar to that of the panels 50 described in the preceding figures. The upper edges of the end plates 71 may be flat as shown so that the fixture may be secured directly to the ceiling in any suitable or desired manner, and if the fixture is used in this manner, a cover plate or cover plates 73 with reflecting lower surfaces may be used.

For the purpose of producing the best diffusion of light, it is desirable to mount the tubular illuminators 15 at different elevations relatively to each other, and in a fixture of the type shown by way of example in the drawings, the illuminator or illuminators nearest to the center of the fixture are preferably the lowest, and the tubes at the sides of the fixture are preferably the highest. In order to further provide the maximum diffusion of light, the louvre assemblies employed, including longitudinal and transverse louvre plates, are so arranged as to approximately follow the contour of the arrangement of the illuminators 15, so that, for example, all of those portions of the lower edges of the transverse louvre plates adjacent to the illuminators will be approximately equidistant from the nearest illuminator. Consequently, in Figs. 15 and 16, three of the longitudinal louvre plates 75 are shown similar in form, and extend below the two middle illuminators 15 to a sufficient extent to prevent any one looking upwardly at the fixture from either side thereof at an angle of less than 45° from seeing these two illuminators. The other longitudinal louvre plates 76 are arranged at approximately the same elevation relatively to the nearest illuminators 15, namely, those which are second from the sides of the fixture. The transverse louvre plates 77 are, in the construction shown in Figs. 15 and 16, of a stepped shape, having flat edge portions 78 arranged beneath the middle illuminators 15. The lower edges of these louvre plates then extend upwardly substantially in a vertical direction, as indicated at 79 and join flat edge portions 80 arranged below the next two illuminators. Similarly, if six tubular illuminators are employed, the transverse louvre plates have additional upwardly extending edges 81 terminating in substantially horizontal edges 82 which are preferably spaced below the outer illuminators 15 at approximately the same distance below the same as the other horizontal edges 80 and 78 are spaced below the illuminators nearest thereto.

By means of this construction, a very excellent diffusion of light results, since the reflecting faces of the various parts of the louvre assemblies reflect light in different directions. The successively higher longitudinal louvre plates expose greater surfaces of the lower louvre plates, which better enables light reflected by the lower plates to be diffused through the room. The fixture also presents a very pleasing and modernistic appearance, and by means of the construction described, it is possible to arrange the tubular illuminators at different elevations and at the same time the louvre assembly is so constructed that all of the illuminators are substantially equidistant from those portions of the lower edges of the louvre assembly which are nearest thereto, thus permitting the maximum amount of light to leave the fixture directly either without reflection, or with only a single reflection, which in turn materially increases the efficiency of the fixture.

The fixture shown in Fig. 17 is very similar in construction to that described in Figs. 15 and 16, except that the end plates 85, as well as the louvre assembly is of somewhat different shape, having curved lower edges or surfaces in place of the stepped arrangement shown in Figs. 15 and 16. The longitudinally extending louvre plates 86 in this construction are similarly arranged at different elevations, so that their lower edges are spaced at approximately equal distances from adjacent illuminators. The transverse louvre plates 87 have their lower edges curved in such a manner that these lower edges approximately follow the arrangement of the illuminators. The curvature of the lower surface may, of course, be varied to some extent, depending upon the artistic effects desired, but preferably all portions of the lower edges of the transverse louvre assemblies immediately below the illuminators are spaced approximately at the same distances from the adjacent illuminators.

While we have illustrated in Figs. 15 to 17 two forms of fixtures, it will be obvious that it is not intended to limit this invention to the particular forms shown, since our improvements for increasing the efficiency of fixtures as illustrated in Figs. 15 to 17 may be applied to other types of fixtures employing tubular illuminators and differing widely in contour and shape.

We claim as our invention:

1. A lighting fixture for use with tubular illuminators and including an elongated frame for supporting a plurality of illuminators in substantially parallel relation to each other and to said frame, said frame including a longitudinally extending hollow beam formed of sheet material and having a side thereof substantially open, end plates secured to and closing the open ends of said beam and extending laterally and downwardly therefrom, means on said end plates for supporting the ends of said illuminators, spaced retaining bars extending between and secured to said end plates, a louvre assembly including a plurality of spaced upright webs extending lengthwise and transversely of said fixture, said longitudinal webs having their ends supported by said end plates, and panels of translucent material arranged at the sides of said fixture and supported by said retaining bars.

2. A lighting fixture for use with tubular illuminators and including an elongated frame for supporting a plurality of illuminators in substantially parallel relation to each other and to said frame, said frame including a longitudinally extending hollow beam, end plates secured to the ends of said beam and extending laterally and downwardly therefrom, means on said end plates for supporting the ends of said illuminators, and a louvre assembly comprising a plurality of vertical webs extending crosswise and lengthwise of said fixture, said louvre assembly including transversely extending upright end members secured to the ends of said lengthwise webs and secured in spaced relation to said end plates, and forming with said end plates spaces for containing and concealing conductors leading to the ends of said illuminators.

3. A lighting fixture for use with tubular illuminators, and including a frame comprising a longitudinally extending hollow beam and upright end plates secured to the opposite ends of said beam, said hollow beam providing a space in the interior thereof for electrical devices for use in connection with said tubular illuminators, means on said end plates for supporting and supplying electric current to said illuminators, a louvre assembly arranged in the lower portion of said fixture below said illuminators, said louvre assembly including upright end members permanently secured to said louvre assembly and removably secured to said end plates in spaced relation thereto and having parts extending into proximity to said hollow beam, to form with said end members spaces for containing and concealing conductors leading from the ends of said hollow beam to said illuminator supporting means.

4. A lighting fixture for use with tubular illuminators, including means for supporting said illuminators in substantially parallel relationship to each other and with some of said illuminators arranged at different elevations to other illuminators, a louvre assembly arranged below said illuminators and comprising longitudinal plates arranged in substantially equally spaced arrangement to adjacent illuminators, and transverse plates provided with a plurality of substantially horizontal lower edge portions each of which is arranged below an illuminator, each horizontal portion being spaced approximately the same distance below the nearest illuminator as other horizontal portions.

5. A lighting fixture for use with tubular illuminators, including means for supporting said illuminators in substantially parallel relationship to each other and with some of said illuminators arranged at different elevations to other illuminators, a louvre assembly arranged below said illuminators and comprising longitudinal plates arranged in substantially equally spaced arrangement to adjacent iluminators, and transverse plates having their lower edges so formed that each portion thereof arranged below an illuminator is substantially equidistant therefrom as other portions thereof are to their nearest illuminators.

6. A lighting fixture for use with tubular illuminators and including an elongated frame for supporting a plurality of illuminators in substantially parallel relation to each other and to said frame, said frame including a longitudinally extending hollow beam, end plates secured to the ends of said beam and extending laterally and downwardly therefrom, means on said end plates for supporting the ends of said illuminators, and a louvre assembly comprising a plurality of vertical webs extending crosswise and lengthwise of said fixture, said louvre assembly including transversely extending upright end members secured in spaced relation to said end plates and forming with said end plates spaces for containing and concealing conductors leading to the ends of said illuminators, said end members of said louvre assembly each having a bottom flange bridging and closing the space between said member and the adjacent end plate, and said lengthwise vertical webs of said louvre assembly having terminal portions extending along the bottom faces of said space closing flanges of said end members.

7. A lighting fixture for use with tubular illuminators and including an elongated frame for supporting a plurality of illuminators in substantially parallel relation to each other and to said frame, said frame including a longitudinally extending hollow beam, end plates secured to the ends of said beam and extending laterally and downwardly therefrom, means on said end plates for supporting the ends of said illuminators, a louvre assembly secured to said end plates and including a plurality of spaced upright webs extending lengthwise and transversely of said fixture, panels of translucent, somewhat flexible material arranged at the sides of said fixture and having a curved form in transverse section, said end plates having parts conforming to the curvature of said panels and against which the ends of said panels abut, and means for retaining said panels in engagement with said parts of said end plates.

8. A lighting fixture for use with tubular illuminators and including an elongated frame for supporting a plurality of illuminators in substantially parallel relation to each other and to said frame, said frame including a longitudinally extending hollow beam, end plates secured to the ends of said beam and extendng laterally and downwardly therefrom, means on said end plates for supporting the ends of said illuminators, a louvre assembly secured to said end plates and including a plurality of spaced upright webs extending lengthwise and transversely of said fixture, panels of translucent, somewhat flexible material arranged at the sides of said fixture and having a curved form in transverse section, said end plates having parts conforming to the curvature of said panels and against which the adjacent ends of said panels abut, transverse bars on said frame intermediate said end plates also having a conformation similar to that of said panels, curved holding strips for pressing an end of a panel against each transverse bar to retain said panels in shape, and clips on said end plates cooperating with said panel engaging parts of said plates to hold said adjacent ends of said panels in position and forming with said end plate parts slip connections between said plates and said panels whereby said panels may expand and contract.

9. A lighting fixture for use with tubular illuminators and including an elongated frame for supporting said illuminators, said frame including a longitudinally extending hollow beam having a longitudinally extending opening therein through which electrical devices for use with said illuminators may be inserted into and removed from the interior of said beam, and substantially upright end plates secured to and closing the ends of said hollow beam and extending below said beam, current conducting connectors secured to said plates and adapted to receive the ends of said tubular illuminators for supporting said illuminators in substantially parallel relation to and below said beam, current conducting parts arranged in said hollow beam and connected with said electrical devices in said beam and said connectors for supplying electric current to said illuminators, said beam having outer reflecting surfaces, a louvre assembly arranged below said beam and secured at its ends to said end plates, and means on said beam for suspending said fixture in its operative position.

10. A lighting fixture for use with tubular illuminators and including an elongated frame for supporting a plurality of illuminators in substantially parallel relation to each other and to said frame, said frame including a longitudinally extending hollow beam having openings in the upper face thereof to receive electrical devices for use with said illuminators, end plates secured to and closing the open ends of said beam and extending laterally and downwardly therefrom, means on said end plates for supporting the ends of said illuminators below and at the sides of said beam, and a louvre assembly including longitudinal and transversely extending upright webs, the longitudinally extending webs being arranged substantially parallel to and midway between adjacent illuminators, and being secured at their ends to said end plates.

HAROLD B. ALDERMAN.
ROY R. WILEY.
WALLACE K. WILEY.